(12) United States Patent
Ma et al.

(10) Patent No.: US 12,422,041 B2
(45) Date of Patent: Sep. 23, 2025

(54) Y-SHAPED PACKER

(71) Applicant: HENGXIANG TECHNOLOGY INC., LTD, Hebei (CN)

(72) Inventors: Meiqin Ma, Hebei (CN); Jianbang Sun, Hebei (CN); Xiaojuan Chen, Hebei (CN); Chengang Shi, Hebei (CN); Yasheng Zhang, Hebei (CN); Ting Yin, Hebei (CN); Yongxiao Lei, Hebei (CN); Baoquan Liu, Hebei (CN); Jiande Tian, Hebei (CN)

(73) Assignee: HENGXIANG TECHNOLOGY INC., LTD, Hebei (CN)

( * ) Notice: Subject to any disclaimer, the term of this patent is extended or adjusted under 35 U.S.C. 154(b) by 0 days.

(21) Appl. No.: 18/547,516

(22) PCT Filed: Feb. 23, 2023

(86) PCT No.: PCT/CN2023/077813
§ 371 (c)(1),
(2) Date: Aug. 23, 2023

(87) PCT Pub. No.: WO2023/246144
PCT Pub. Date: Dec. 28, 2023

(65) Prior Publication Data
US 2024/0392879 A1 Nov. 28, 2024

(30) Foreign Application Priority Data
Jun. 24, 2022 (CN) .......................... 202210725470.9

(51) Int. Cl.
*F16J 15/02* (2006.01)
*E02D 15/06* (2006.01)

(52) U.S. Cl.
CPC ............. *F16J 15/022* (2013.01); *E02D 15/06* (2013.01)

(58) Field of Classification Search
CPC ........ F16J 15/002; F16J 15/022; F16J 15/027; F16J 15/46; F16J 15/104; E02B 17/0008; E21B 33/1208; E21B 33/127; E02D 15/06
See application file for complete search history.

(56) References Cited

U.S. PATENT DOCUMENTS

| | | | | |
|---|---|---|---|---|
| 4,181,454 A | * | 1/1980 | Knox | .................. E02B 17/0008 405/227 |
| 4,183,698 A | * | 1/1980 | Coone | ................. E02B 17/0008 405/195.1 |

(Continued)

FOREIGN PATENT DOCUMENTS

| | | | |
|---|---|---|---|
| CN | 1363743 A | * | 8/2002 |
| CN | 204780931 U | | 11/2015 |

(Continued)

*Primary Examiner* — Nicholas L Foster
(74) *Attorney, Agent, or Firm* — NKL Law; Allen Xue

(57) ABSTRACT

A Y-shaped packer includes a supporting part, fixedly sleeved on the outer wall of the inner barrel; a plugging part having an inner end part connected with the outer wall of the supporting part, and an outer end part tilted upward so that an angle between the plugging part and the supporting part is an acute angle; an expansion seal connected with the supporting part. The expansion seal is located above the plugging part. The Y-shaped packer is arranged in an annular gap between an outer barrel and an inner barrel. Through the combination of the supporting part arranged obliquely and the expansion seal arranged above the supporting part, the invention-shaped packer can realize the effect of secondary sealing on the gap between the outer barrel and the inner barrel.

6 Claims, 5 Drawing Sheets

(56) References Cited

U.S. PATENT DOCUMENTS

| | | |
|---|---|---|
| 10,508,399 B1 | 12/2019 | Lee |
| 2014/0332232 A1 | 11/2014 | Hallandbæk et al. |
| 2016/0032550 A1* | 2/2016 | Lee .......................... E02D 5/526 285/369 |
| 2017/0241095 A1* | 8/2017 | Lee ........................... E02D 5/22 |

FOREIGN PATENT DOCUMENTS

| | | | |
|---|---|---|---|
| CN | 205530323 U | * | 8/2016 |
| CN | 211547793 U | * | 9/2020 |
| CN | 112962612 A | | 6/2021 |
| CN | 214530673 U | | 10/2021 |
| CN | 113897967 A | | 1/2022 |
| CN | 216405355 U | | 4/2022 |
| CN | 115013529 A | | 9/2022 |
| CN | 115030230 A | | 9/2022 |
| CN | 115045342 A | | 9/2022 |
| CN | 217480118 U | | 9/2022 |

\* cited by examiner

Y-SHAPED PACKER

TECHNICAL FIELD

The present invention relates to the technical field of installation of offshore jackets, more particularly to a Y-shaped packer.

BACKGROUND

The pile foundation fixation mode is used in the field of offshore wind power. Firstly, a steel pipe pile (outer barrel) is driven into a seabed for fixing, and then a jacket (inner barrel) is lifted. The end of a supporting leg of the jacket is inserted into a port of the steel pipe pile, and the jacket is placed, leveled and grouted. The steel pipe pile and the supporting leg of the jacket are bonded together by cement slurry. The packer is mainly used for sealing a gap between the steel pipe pile and the supporting leg before solidification of the cement slurry to prevent the cement slurry from flowing out and causing poor bonding and waste of materials such as cement slurry.

At present, the supporting structure of the packer is mainly configured by welding a horizontal annular plate perpendicular to the barrel body of the inner barrel outside the inner barrel, and the bearing capacity of the supporting structure is mainly provided by the welding strength between the annular plate and the inner barrel. For the pile foundation with a small gap between the outer barrel and the inner barrel, the supporting force can be guaranteed, but when the gap between the outer barrel and the inner barrel is too large, the amount of the cement slurry is also increased, which may cause the yield of the horizontal annular plate and further cause the deformation of the horizontal annular plate.

There is the gap between a supporting plate and the inner wall of the outer barrel, resulting in the leakage of the cement slurry and further causing the failure of the effect of the supporting structure.

At the same time, in the prior art, the gap between the outer barrel and the inner barrel is sealed only by the arrangement of the supporting structure, which is poor in sealing performance and easy to leak the cement slurry from the gap between the supporting structure and the inner wall of the outer barrel, thereby causing the failure of the effect of the packer.

Therefore, the problem to be urgently solved by those skilled in the art is how to provide a packer capable of enhancing the supporting strength of a supporting part in the annular gap between the outer barrel and the inner barrel while preventing the cement slurry from leaking from the gap between the supporting part and the inner wall of the outer barrel.

SUMMARY

In view of this, the present invention provides a Y-shaped packer in order to solve one of the problems in the above background, increase the strength of the supporting part and improve the sealing performance of the gap between the outer barrel and the inner barrel.

To achieve the above purpose, the present invention adopts the following technical solution:

A Y-shaped packer is arranged in an annular gap between an outer barrel and an inner barrel and comprises:

a supporting part, wherein the supporting part has an annular structure, and the supporting part is fixedly sleeved on the outer wall of the inner barrel;

a plugging part, wherein the plugging part also has an annular structure, the inner end part of the plugging part is connected with the outer wall of the supporting part, and the outer end part of the plugging part is tilted upward so that an angle between the plugging part and the supporting part is an acute angle;

an expansion seal, wherein the expansion seal has an annular structure, the expansion seal is connected with the supporting part, and the expansion seal is located above the plugging part.

Further, the outer wall of the supporting part is provided with a connecting plate, and the inner end part of the plugging part is connected with the connecting plate.

Further, the inner end part of the plugging part is provided with a clamping groove, and the clamping groove is clamped with the connecting plate.

Further, the outside dimension of the plugging part is slightly larger than the outside dimension of the outer barrel.

Further, the supporting part has an annular structure formed by sequentially splicing a plurality of supporting blocks, and the inner wall of each supporting block is provided with a curved groove adapted to the inner barrel.

Further, the plugging part has an annular structure formed by sequentially splicing a plurality of plugging blocks, and the plurality of plugging blocks are connected in one-to-one correspondence with the plurality of supporting blocks.

Further, the expansion seal comprises a bag body and a water expansion core, the water expansion core is arranged in the bag body, and the bag body is fixedly connected with the supporting part.

Further, the outer wall of the bag body is provided with an annular connecting section; the annular connecting section is integrally formed with the bag body; a circle of through holes are arranged at intervals on the annular connecting section along a circumferential direction; the supporting part is provided with threaded holes corresponding to the through holes; and the bag body is pressed on the supporting part through a pressing plate having an installing hole.

It is known from the above technical solution that compared with the prior art, the present invention discloses and provides a Y-shaped packer. By arranging the plugging part at an acute angle with the supporting part, the support is formed among both ends of the plugging part, the outer wall of the inner barrel and the inner wall of the outer barrel respectively, the supporting force direction of the plugging part relative to the traditional supporting structure is changed, and the bearing capacity of the plugging part is increased. At the same time, through the combination of the supporting part arranged obliquely and the expansion seal arranged above the supporting part, the effect of secondary sealing on the gap between the outer barrel and the inner barrel can be realized.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Wherein: 1 outer barrel; 2 inner barrel; 3 supporting part; 4 plugging part; 5 connecting plate; 6 clamping groove; 7 pressing plate; 8 supporting block; 9 plugging block; 10 expansion seal; 101 bag body; 102 water expansion core; 11 annular connecting section.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
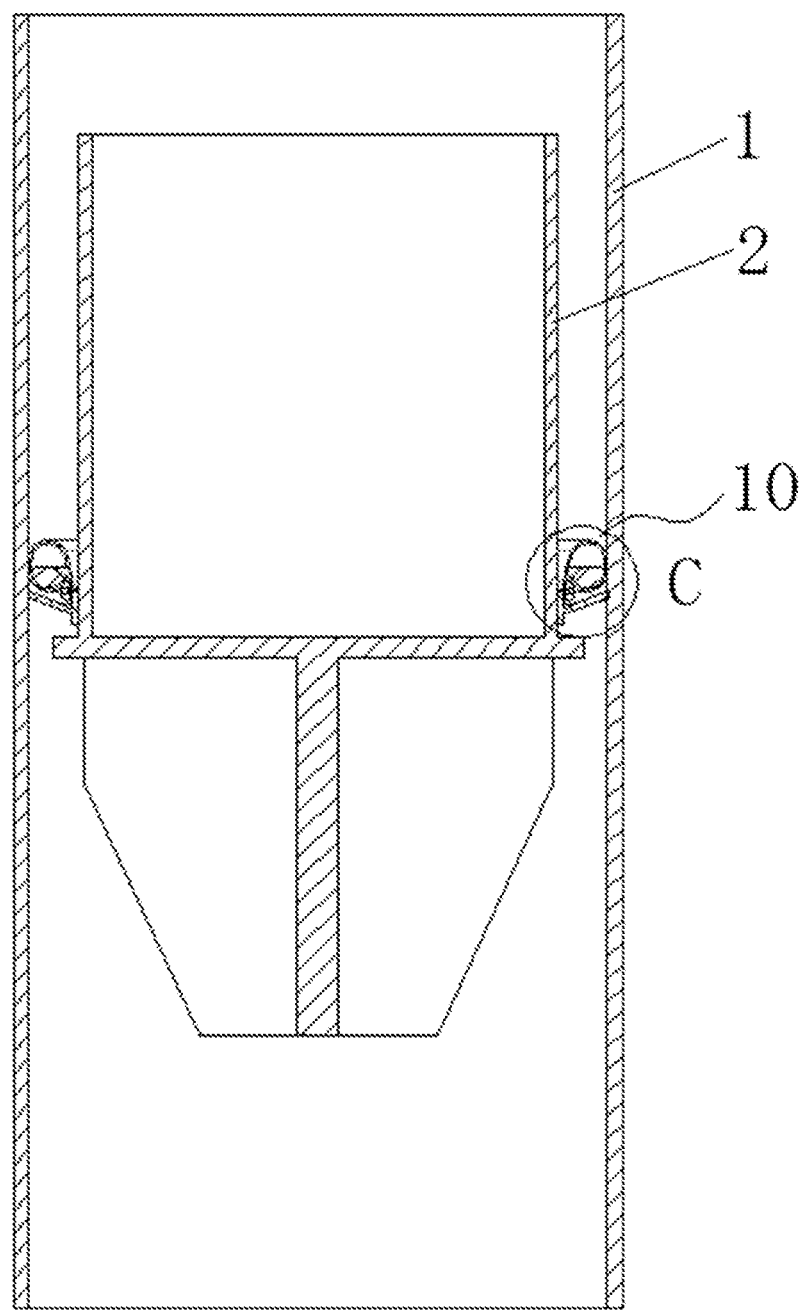
FIG. 1 is a sectional view of a connection structure of a packer, an outer barrel and an inner barrel provided by the present invention.
Figure 2:
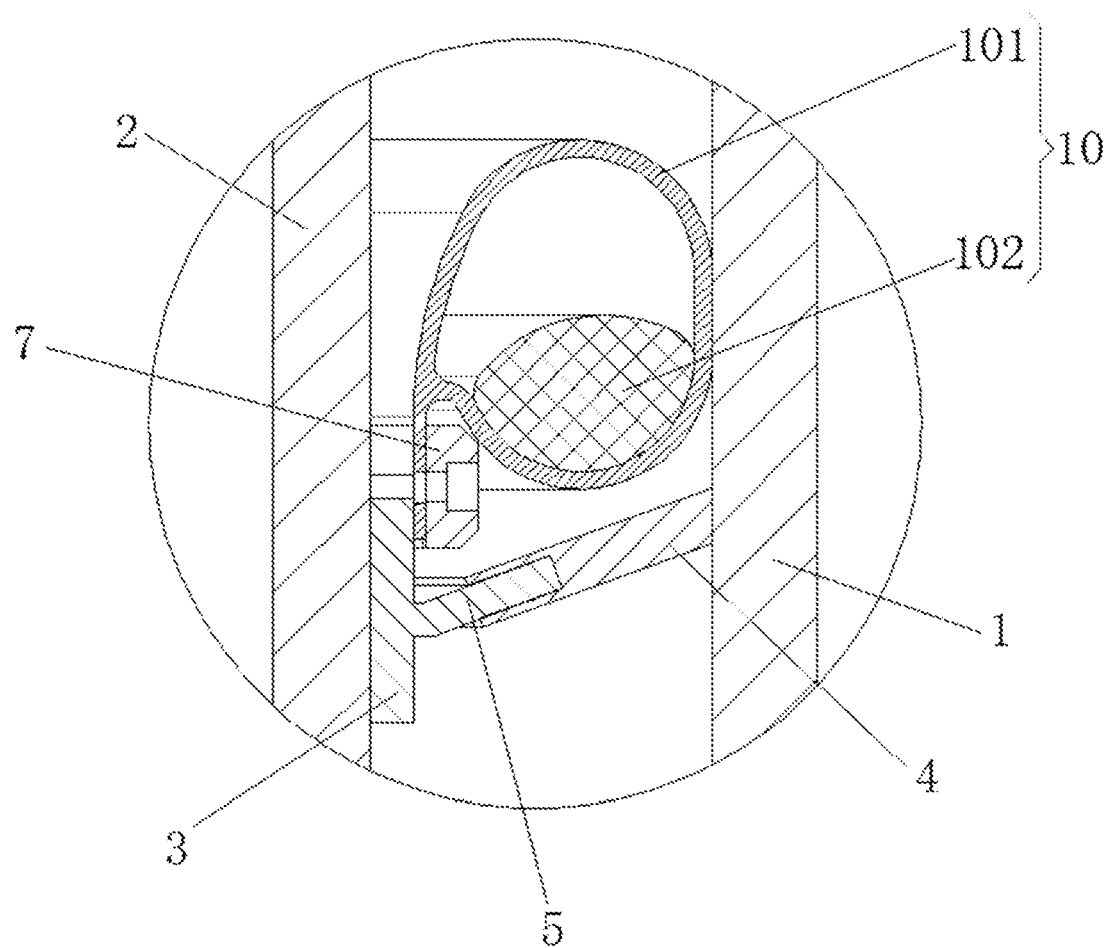
FIG. 2 is a local amplified diagram of C in FIG. 1 provided by the present invention.
Figure 3:
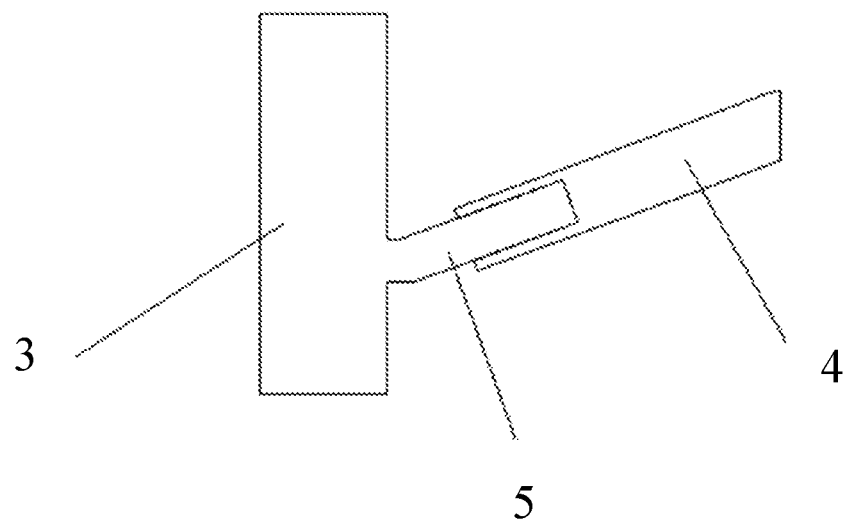
FIG. 3 is a schematic diagram of a connection structure of a supporting part and a plugging part provided by the present invention.
Figure 4:
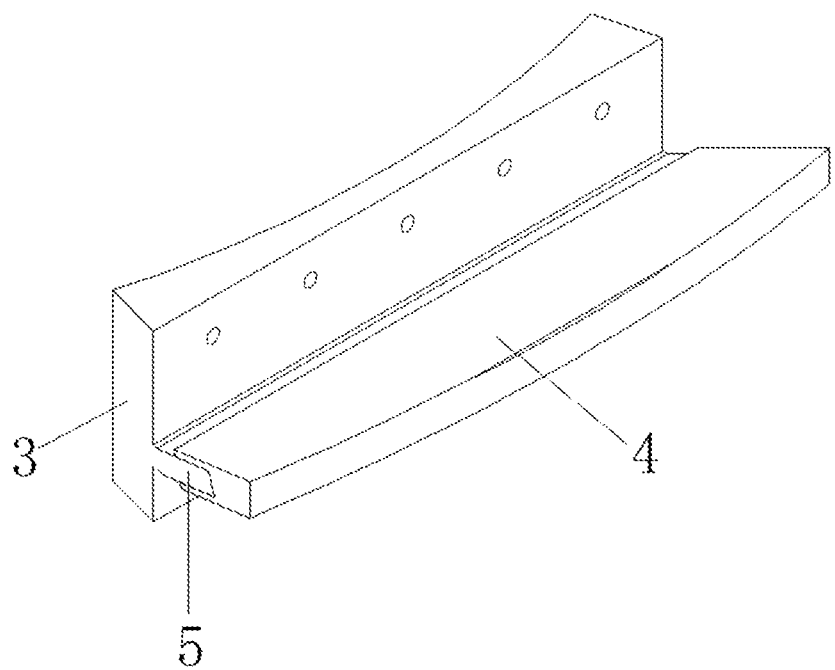
FIG. 4 is a structural schematic diagram of connection of a supporting part and a plugging part in another viewing angle provided by the present invention.
Figure 5:
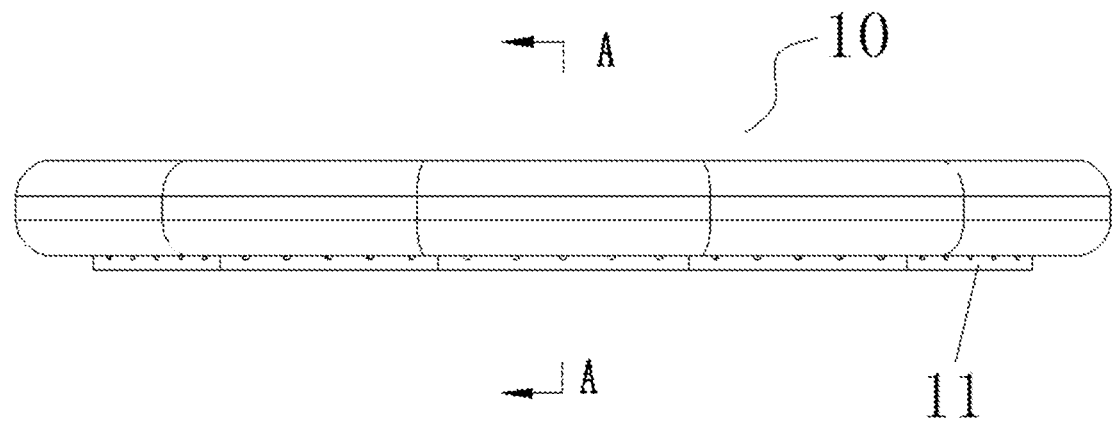
FIG. 5 is a structural schematic diagram of an expansion seal provided by the present invention.
Figure 6:
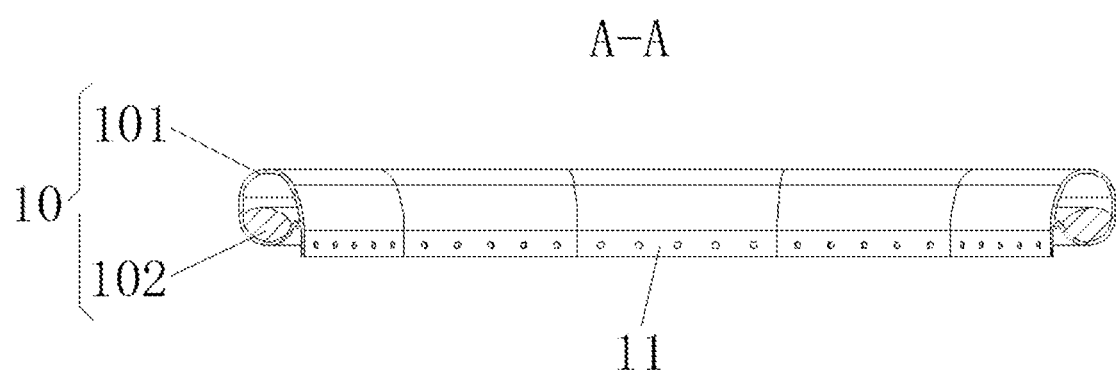
FIG. 6 is a sectional view in A-A direction in FIG. 5 provided by the present invention.
Figure 7:
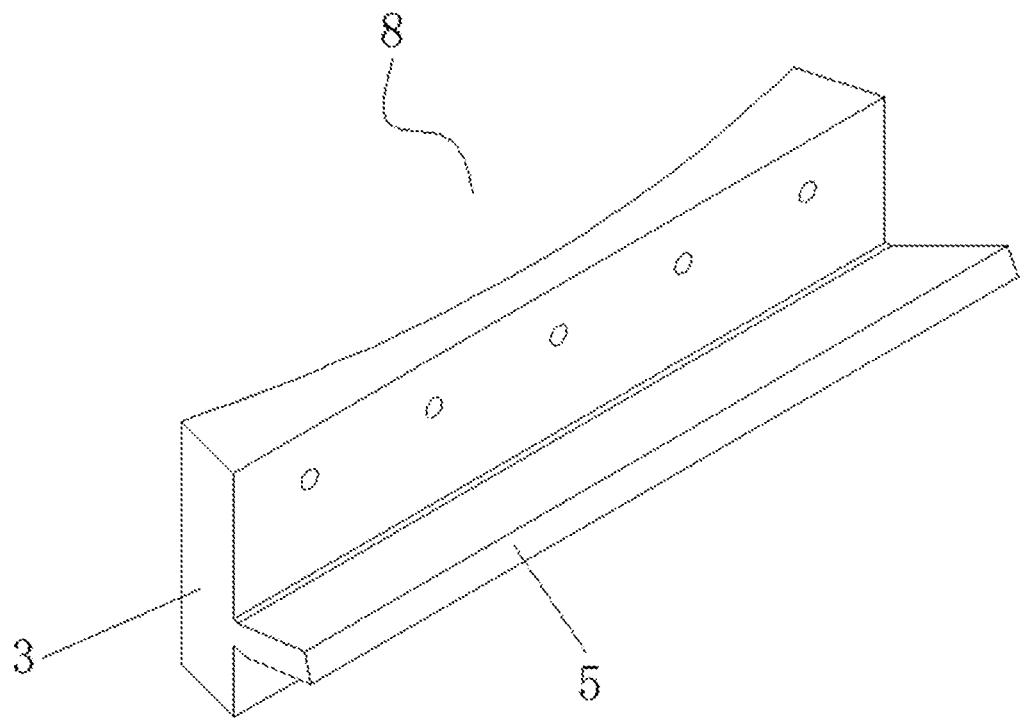
FIG. 7 is a structural schematic diagram of a supporting block provided by the present invention.
Figure 8:
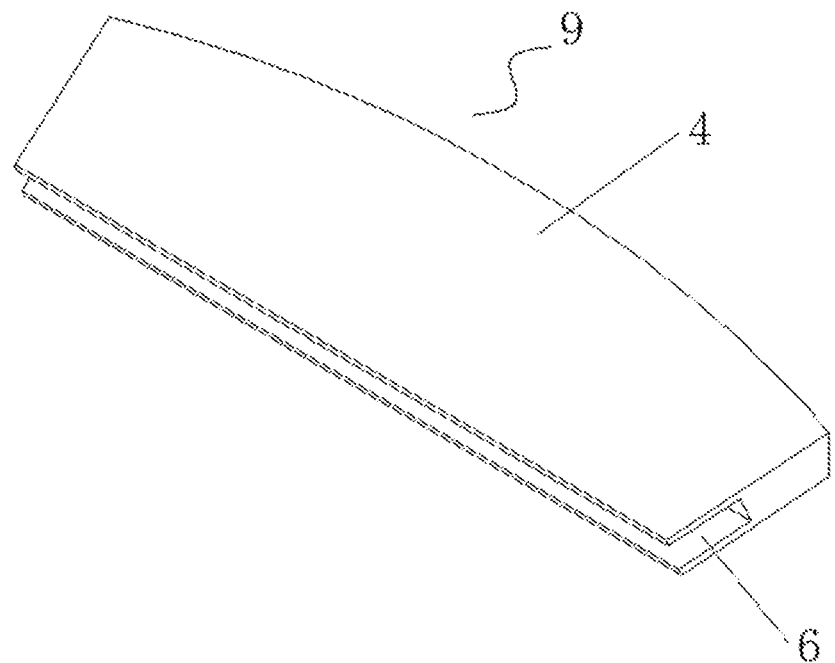
FIG. 8 is a structural schematic diagram of a plugging block provided by the present invention.

As shown in FIGS. 1-8, embodiments of the present invention disclose a Y-shaped packer. The Y-shaped packer is arranged in an annular gap between an outer barrel 1 and an inner barrel 2. The Y-shaped packer comprises:

a supporting part 3, wherein the supporting part 3 has an annular structure, and the supporting part 3 is fixedly sleeved on the outer wall of the inner barrel 2;

a plugging part 4, wherein the plugging part 4 also has an annular structure, the inner end part of the plugging part 4 is connected with the outer wall of the supporting part 3, and the outer end part of the plugging part 4 is tilted upward so that an angle between the plugging part 4 and the supporting part 3 is an acute angle;

an expansion seal 10, wherein the expansion seal 10 has an annular structure, the expansion seal 10 is connected with the supporting part 3, and the expansion seal 10 is located above the plugging part 4. The bottom of the inner barrel 2 is a closed blind end structure, and the inner barrel 2 and the outer barrel 1 are coaxially arranged. When a pile foundation is constructed in the field of offshore wind power, the outer barrel 1 is a steel pipe pile, the supporting part 3 is steel, and the supporting part 3 is fixedly connected with the inner barrel 2 by welding. The plugging part 4 is made of elastic material, and one end of the plugging part 4 close to the inner barrel 2 is fixedly connected with the supporting part 3. When the inner barrel 2 is installed in the outer barrel 1, the outer end part of the plugging part 4 contacts the inner wall of the outer barrel 1, and the supporting force direction of the plugging part 4 relative to the traditional supporting structure is changed to increase the bearing capacity of the plugging part 4, so that the gap between the inner barrel 2 and the outer barrel 1 can be sealed by the supporting part 3 and the plugging part 4, to pour the cement slurry in the gap between the outer barrel 1 and the inner barrel 2 and prevent the leakage of the cement slurry. In addition, the expansion seal 10 is arranged above the plugging part 4; the expansion seal 10 expands when encountering seawater in the outer barrel 1, and the expanded expansion seal 10 is tensioned in the annular gap between the outer barrel 1 and the inner barrel 2, so as to realize the sealing between the inner wall of the outer barrel 1 and the outer wall of the inner barrel 2, to prevent the cement slurry from flowing into the sea bottom from the gap between the outer barrel 1 and the inner barrel 2. That is, the expansion seal 10 achieves some sealing effects. Even if a little cement slurry flows through the gap between the expansion seal 10 and the inner wall of the outer barrel 1 or the outer wall of the inner barrel 2, this part of cement slurry is also blocked by the plugging part 4. The plugging part 4 is used to achieve secondary sealing, and the effect of secondary sealing can be realized for the annular gap between the outer barrel 1 and the inner barrel 2 by combining the expansion seal 10 and the Y-shaped supporting part.

In the present embodiment, specifically, the expansion seal 10 comprises a bag body 101 and a water expansion core 102, and the water expansion core 102 is arranged in the bag body 101. The bag body 101 is fixedly connected with the support parting 3, and the bag body 101 has flexibility and water permeability. The specific material of the bag body 101 can be woven fabric, woven net, textile net, non-woven fabric or other water-permeable materials with small pores, and the water expansion core 102 has a high expansion coefficient in seawater. The water expansion core 102 can be specifically water expansion rubber or other water expansion materials, and has certain strength after expansion.

After complete expansion, the bag body 101 is supported and can ensure certain strength. The bag body 101 also has certain strength. When the seawater enters the bag body 101, the seawater is in contact with the water expansion core 102, which causes the water expansion core 102 to expand to support the bag body 101. The supported bag body 101 is located at the upper part of the plugging part 4, and the inner part of the supported bag body 101 is in contact with the outer wall of the inner barrel 2. The outer side of the supported bag body 101 is in contact with the inner wall of the outer barrel 1, thereby sealing the gap between the outer barrel 1 and the inner barrel 2 by the expansion seal 10.

After the gap between the outer barrel 1 and the inner barrel 2 is sealed, the cement slurry is poured into the gap between the outer barrel 1 and the inner barrel 2 so that the cement slurry poured may not flow out of the gap between the outer barrel 1 and the inner barrel 2.

In the above embodiments, preferably, the outer wall of the bag body 101 is provided with an annular connecting section 11; the annular connecting section 11 is integrally formed with the bag body 101; a circle of through holes are arranged at intervals on the annular connecting section 11 along a circumferential direction; the supporting part 3 is provided with threaded holes corresponding to the through holes; and the bag body 101 is pressed on the supporting part 3 through a pressing plate 7 having an installing hole. By pressing the annular connecting section 11 on the supporting part 3 using the pressing plate 7, the connection strength between the expansion seal 10 and the supporting part 3 can be ensured, a positioning effect on the expansion seal 10 can be performed, and the expansion seal 10 is prevented from tilting in the expansion process to avoid causing uneven sealing around the gap between the inner barrel 2 and the outer barrel 1.

According to some embodiments of the present invention, the outer wall of the supporting part 3 is provided with a connecting plate 5, and the inner end part of the plugging part 4 is connected with the connecting plate 5. Preferably, the supporting part 3 is composed of a vertical plate and the connecting plate 5, and the vertical plate and the connecting plate 5 are integrally formed. The vertical plate is welded with the outer wall of the inner barrel 2. The connecting plate 5 and the vertical plate are tilted at a certain angle, and the inclination angle is the angle between the plugging part 4 and the supporting part 3. The connecting plate 5 plays a guide effect on the plugging part 4, and the plugging part 4 and the connecting plate 5 can be directly connected by bolts.

In the above embodiments, preferably, the inner end part of the plugging part 4 is provided with a clamping groove 6, and the clamping groove 6 is clamped with the connecting plate 5. Through the arrangement of the clamping groove 6 and the connecting plate 5, the plugging part 4 can be quickly clamped to the connecting plate 5, which simplifies the connection technology between the plugging part 4 and the connecting plate 5. In other embodiments, the supporting part 3 and the plugging part 4 may also be integrally formed.

According to some embodiments of the present invention, preferably, the outside dimension of the plugging part 4 is slightly larger than the outside dimension of the outer barrel 1. Through the arrangement of the structure, after the inner barrel 2 is loaded into the outer barrel 1, the edge of the plugging part 4 is bent upward to a certain extent, which can ensure that the outer edge of the plugging part 4 is fully in contact with the inner wall of the outer barrel 1, so as to realize the sealing for the gap between the outer barrel 1 and the inner barrel 2.

In the above embodiments, the supporting part 3 has an annular structure formed by sequentially splicing a plurality of supporting blocks 8, and the inner wall of each supporting block 8 is provided with a curved groove adapted to the inner barrel 2. The plugging part 4 has an annular structure formed by sequentially splicing a plurality of plugging blocks 9, and the plurality of plugging blocks 9 are connected in one-to-one correspondence with the plurality of supporting blocks 8. When the inner edge of the plugging part 4 is provided with the clamping groove 6, it is convenient to install the plugging part 4 on the supporting part 3 by setting both the support part 3 and the plugging part 4 in a way of splicing multiple units.

Each embodiment in the description is described in a progressive way. The difference of each embodiment from each other is the focus of explanation. The same and similar parts among all of the embodiments can be referred to each other. For the device disclosed by the embodiment, because the device corresponds to the method disclosed by the embodiment, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A packer configured to be disposed in an annular gap between an outer barrel and an inner barrel, comprising:
    a supporting part, wherein the supporting part is an annular cylinder configured to be fixedly sleeved on an outer wall of the inner barrel;
    a plugging part, wherein the plugging part is a circular ring having an inner edge connected with an outer wall of the supporting part and an outer edge tilted upward toward an inner wall of the outer barrel, so that the plugging part and the supporting part form an acute angle therebetween; and
    an expansion seal, wherein the expansion seal is annual in shape and is connected with the supporting part at a location above the plugging part,
    wherein the supporting part comprises a plurality of supporting blocks, and an inner wall of each supporting block is provided with a curved groove adapted to receive a section of a protrusion on the outer wall of the inner barrel.

2. The packer according to claim 1, wherein the outer wall of the supporting part is provided with a connecting plate, and an inner end part of the plugging part is connected with the connecting plate.

3. The packer according to claim 2, wherein the inner edge of the plugging part is provided with a clamping groove, and the clamping groove is clamped with the connecting plate.

4. The packer according to claim 1, wherein the plugging part comprises a plurality of plugging blocks, and the plurality of plugging blocks are connected in one-to-one correspondence with the plurality of supporting blocks.

5. The packer according to claim 1, wherein the expansion seal comprises a bag body and a water expansion core disposed in the bag body, and the bag body is fixedly connected with the supporting part.

6. The packer according to claim 5, wherein an outer wall of the bag body is provided with an annular connecting section; the annular connecting section is integrally formed with the bag body; a plurality of through holes are arranged on the annular connecting section along a circumferential direction thereof; the supporting part is provided with threaded holes corresponding to the through holes; and the bag body is pressed on the supporting part through a pressing plate having an installing hole.

\* \* \* \* \*